(12) United States Patent
Gautheron

(10) Patent No.: US 10,501,221 B2
(45) Date of Patent: Dec. 10, 2019

(54) DEVICE AND METHOD FOR EXTRACTION

(71) Applicant: SIDEL PACKING SOLUTIONS, Corcelles-les-Citeaux (FR)

(72) Inventor: Anthony Gautheron, Coercelles-les-Citeaux (FR)

(73) Assignee: SIDEL PACKING SOLUTIONS, Corcelled-led-Citeaux (FR)

( * ) Notice: Subject to any disclaimer, the term of this patent is extended or adjusted under 35 U.S.C. 154(b) by 0 days.

(21) Appl. No.: 15/333,747

(22) Filed: Oct. 25, 2016

(65) Prior Publication Data
US 2017/0121045 A1 May 4, 2017

(30) Foreign Application Priority Data

Oct. 30, 2015 (FR) ...................... 15 60451

(51) Int. Cl.
*B65H 3/32* (2006.01)
*B65H 3/24* (2006.01)
*B65B 43/46* (2006.01)
*B65G 47/90* (2006.01)
*B65G 59/02* (2006.01)
*B65H 3/50* (2006.01)
*B25J 11/00* (2006.01)
(Continued)

(52) U.S. Cl.
CPC ............. *B65B 43/46* (2013.01); *B25J 11/005* (2013.01); *B25J 15/0028* (2013.01); *B65G 47/90* (2013.01); *B65G 59/02* (2013.01); *B65G 61/00* (2013.01); *B65H 3/327* (2013.01); *B65H 3/50* (2013.01); *B65H 2405/50* (2013.01); *B65H 2701/1764* (2013.01); *Y10S 901/31* (2013.01)

(58) Field of Classification Search
CPC .................. B65H 3/322; B65H 83/025; B65H 2301/4223; B65H 2301/42242; B65H 2405/52; B65H 2511/30; B65H 2601/511; B65H 2701/1826
USPC ........................ 414/795.9, 796, 796.6, 796.9
See application file for complete search history.

(56) References Cited

U.S. PATENT DOCUMENTS 4,457,658 A * 7/1984 Meylan .................. B65H 3/242
414/795.8
4,620,827 A * 11/1986 Sameshima ............ B65H 3/322
271/128
(Continued)

FOREIGN PATENT DOCUMENTS

DE 3612780 A1 * 10/1987 ............. B65H 3/325
DE 10 2006 047 064 B3 10/2007
(Continued)

OTHER PUBLICATIONS

French Search Report, dated Jun. 22, 2016, from corresponding French Application.

*Primary Examiner* — Gregory W Adams

(57) ABSTRACT

An extraction device and method (1) for moving, from a pile (3), a batch (4) of stacked flat products (2) that are not connected to one another and that form the top of the pile (3), with the extraction device (1) including a frame (5), and, mounted in the frame (5), a gripping element (6) in the form of a controlled vise for firmly grasping section by section the batch (4) to be extracted. This device also includes, mounted in the frame (5), a separation element (8), separated from the gripping element (6), carrying a support surface (9) to come under the batch (4).

8 Claims, 7 Drawing Sheets

(51) Int. Cl.
*B25J 15/00* (2006.01)
*B65G 61/00* (2006.01)

(56) References Cited

U.S. PATENT DOCUMENTS

| | | | | |
|---|---|---|---|---|
| 4,623,292 A | * | 11/1986 | Suzuki | B65H 3/325 |
| | | | | 414/796 |
| 5,017,085 A | * | 5/1991 | Ishikawa | B65H 3/325 |
| | | | | 414/796 |
| 5,102,292 A | | 4/1992 | Brinker et al. | |
| 5,169,284 A | | 12/1992 | Berger et al. | |
| 5,425,457 A | * | 6/1995 | Williams | B65H 3/26 |
| | | | | 209/547 |
| 8,777,551 B1 | * | 7/2014 | Widder | B65G 47/90 |
| | | | | 414/796.6 |
| 2002/0154986 A1 | | 10/2002 | Leblanc et al. | |
| 2003/0123962 A1 | | 7/2003 | Mikulic et al. | |

FOREIGN PATENT DOCUMENTS

| | | | | |
|---|---|---|---|---|
| EP | 0 530 426 A1 | | 3/1993 | |
| EP | 1129843 A1 | * | 9/2001 | ........... B26D 7/1827 |
| EP | 1 264 792 A1 | | 12/2002 | |
| JP | S54-24879 U | | 2/1979 | |
| JP | 61188342 A | * | 8/1986 | |
| JP | H3-122027 U | | 12/1991 | |
| JP | 09323837 A | * | 12/1997 | |
| JP | 11139601 A | * | 5/1999 | |
| JP | H11-139601 A | | 5/1999 | |
| JP | 2000-159362 A | | 6/2000 | |
| JP | 2014-037286 A | | 2/2014 | |

* cited by examiner

DEVICE AND METHOD FOR EXTRACTION

FIELD OF THE INVENTION

This invention pertains to the field of packaging in cardboard boxes and has as its object, on the one hand, an extraction device for feeding, from flat boxes initially stacked in a pile, a storage unit of a machine equipped with a box shaper, and, on the other hand, a method that uses this device, namely a method for extracting from the pile a batch of boxes located in the upper part of the pile.

BACKGROUND OF THE INVENTION

The boxes are actually generally in the form of a flat sheet to be folded subsequently, and are placed on a pallet or flat support, on top of one another, not connected to one another. These boxes then in sheet form can be organized in multiple columns beside one another. It is then necessary to extract from them an upper part to take it into the machine in which the box will be formed. This machine can be a box shaper or have other functions such as packing, for example.

In this field, U.S. Pat. No. 5,102,292 describes, for example, a device that is equipped with a lower shovel that is inserted sideways under the upper batch of sheets to be grasped, while blocks press the batch at the top. The shovel then has a fine enough end for being inserted between the batch and the box under it. The same type of insertion is proposed by US2003/0123962, with the batch being pressed up, however, by means of suction cups. In the two cases, the purpose of the support at the top is essentially to hold the batch to be grasped, while the shovel or blade is inserted between two flat boxes. This force has as its object to prevent the shovel from pushing horizontally the batch to be grasped, which can make the sheets fall.

US2002/0154986 proposes, after the insertion of the blade, inserting along the blade and under it a more rigid sheet that then makes it possible to raise the entire batch. A counter-sheet then clamps the batch. The drawback is that the position of the blade and the position of the more rigid sheet should be the same. It is therefore obligatory to insert the blade where it will be necessary to hold the batch with the clamp that the sheet and the counter-sheet form together.

EP530426 discloses a principle in which the boxes under the batch to be extracted are crushed to make possible the frontal insertion of the shovel.

An insertion of a shovel or blade between two sheets, as taught in these documents, has, however, the drawback of running the risk of bringing the shovel directly against a sheet, which then creates the danger not only of damaging the sheet and actually the sheets against which it abuts, but also to push the pile, and even to cause it to drop completely or in part. Exerting pressure on the top of the column into which the shovel is inserted does not solve the problem of damaging products in the area of the section.

Some embodiments also propose using the pallet in such a way that the columns of sheets come in against vertical support surfaces that oppose a force with the movement of insertion of the shovel for the purpose of stabilizing the column. This type of principle can therefore function only in such an environment and imposes major constraints on the pile itself since it must always be able to come against such a resistance surface.

SUMMARY OF THE INVENTION

In this context, the purpose of the invention is to improve the existing state of the art by proposing a solution for extraction of an upper end part of a column of box sheets, which is precise, which does not damage the boxes, which can be used for any type of configuration, and/or which is easy to implement.

To do this, the invention proposes operating in two steps, namely a firm grasping of the batch, preceded by a separation of the batch that is done by bringing a separating tool against the bottom of the batch, the latter having as its object to make possible the installation of the grasping tool.

The invention thus has as its object an extraction device for moving, from one pile, a batch of stacked flat products that are not connected to one another and that form the top of said pile, with said extraction device comprising a frame, and, mounted in said frame, a gripping means in the form of a controlled vise for firmly grasping section by section the batch that is to be extracted.

This device is characterized in that it also comprises, mounted in the frame, a separation means, separated from the gripping means, each to be able to act in a different zone of the batch, said separation means carrying a support surface to come under the batch to be extracted in such a way as to separate it at the bottom from the rest of the pile and thus to clear a space to make it possible then to pick up the batch by the gripping means.

The invention also has as its object a method implemented by this device, namely a method for extracting from a vertical pile a batch of stacked flat products that are not connected to one another, forming the top of said pile, comprising the sequence of steps consisting in Slightly separating the batch from the rest of the pile under it Grasping the batch section by section using a gripping means, and Moving the batch in the direction of a storage unit of a treatment machine of the packaging or box shaper type.

This method is characterized in that the separation of the batch is carried out by initially bringing a support surface upward, against the bottom of the batch.

BRIEF DESCRIPTION OF THE DRAWINGS

The invention will be better understood thanks to the description below, which is based on possible embodiments, explained in an illustrative and in no way limiting manner, with reference to the accompanying figures, in which.

DETAILED DESCRIPTION OF THE INVENTION

Figure 1:
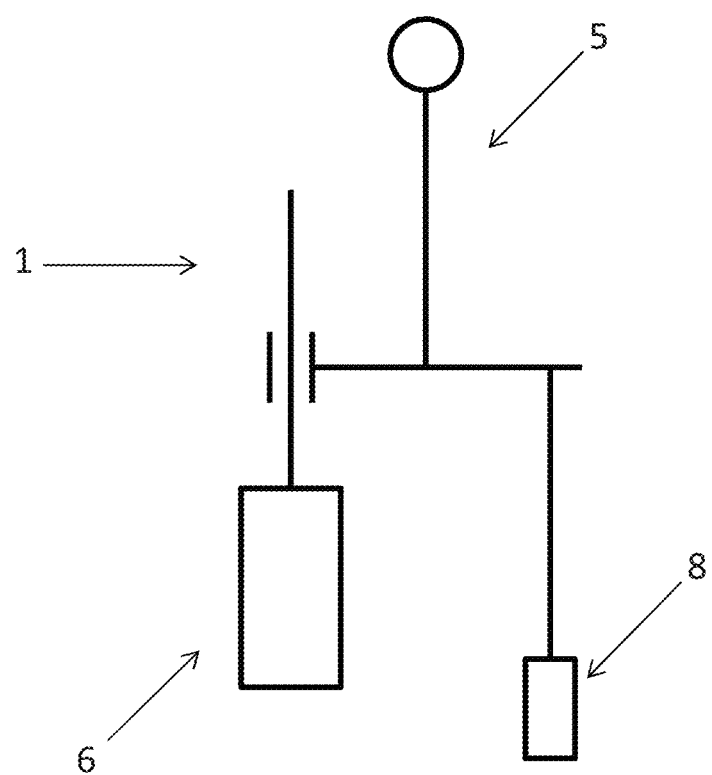
FIG. 1 diagrammatically illustrates a gripping head with a degree of movability for the gripping tool.

The invention therefore first of all has as its object an extraction device 1 for moving, from a pile 3, a batch 4 of stacked flat products 2 that are not connected to one another and that form the top of said pile 3, with said extraction device 1 comprising a frame 5, and, mounted in said frame 5, a gripping means 6 in the form of a controlled vise for firmly grasping section by section the batch 4 to be extracted, in such a way that the gripping means 6 can take away the entire batch 4, with the extraction device 1 also comprising in particular a robotic means 7 for moving the frame 5 with the batch 4 of products 2 grasped by the gripping means 6.

The extraction device 1 is therefore used to take off from a pile 3 a number of products 2 from the highest one in the pile 3. As will also be described later, the products 2 are generally organized in groups, with these groups being mounted head-to-foot, one above the other. The extraction device 1 then ensures the extraction from the pile 3 of the first group by starting from the top in the pile 3, which forms the batch 4 to be extracted.

According to the invention, the extraction device 1 comprises, in addition, mounted in the frame 5, a separation means 8, separated from the gripping means 6, each to be able to act in a different zone of the batch 4, said separation means 8 carrying a support surface 9 to come under the batch 4 to be extracted in such a way as to separate it at the bottom from the rest of the pile 3 and thus to clear a space that makes it possible then to pick up the batch 4 by the gripping means 6.

The gripping means 6 can take away the batch 4 optionally without any other means for holding the batch 4, which means that it is positioned in such a way as to prevent gravity from deforming the batch 4 of boxes held by its section in an awkward position.

To avoid damaging the products 2 by inserting such a gripping means 6 in the core of a pile 3, the extraction device 1 comprises a distinct separation means 8 that has the essential function of releasing a part of the lower surface of the batch 4. The gripping means 6 can then grasp the batch 4 against this lower surface released from contact with the pile 3 under the batch 4. Both the separation means 8 and the gripping means 6 then come against the batch 4 with a movement upward, coming against the lower surface of the batch 4.

The separation means 8 and the gripping means 6 are separated and therefore distinct from one another so as to be able optionally to act at the same time on different parts of the batch 4: in the area of the recess 12 for one, and in the area of a robust zone of the batch 4 for the other.

The separation means 8 makes use of the recess 12 under the batch 4 formed by the stacked scalloping 13 of the products 2 under said batch 4 for coming into contact with the batch 4 at the bottom and not at the side. The gripping means 6 then makes use of the space that creates the separation means 8 between the batch 4 and the rest of the pile 3 under it for coming in turn into contact with the batch 4 at the bottom. Once the batch 4 is grasped by the gripping means 6, it is possible to take it away. The separation means 8, sized for working with the recesses 12, is not enough to hold the batch 4 in a satisfactory way during the trip to the storage unit of the machine to be fed with the batch 4.

The correct holding of the batch 4 during the trip to said storage unit is essentially ensured by the gripping means 6, because the latter is not limited by the template of the recess 12. The movement from the pile 3 to the storage unit to be loaded can be made with only the action of the gripping means 6, which forms a strong enough clamp for this purpose. It is also possible to preserve a complementary hold of the batch 4 in the separation means 8 then in clamp form, so that said means balances the weight of the batch 4 and thus prevents the batch 4 from deforming by bending from the clamp that forms the gripping means 6 and from where it extends in an awkward position.

The separation means 8 and the gripping means 6 should therefore be able to act on two different parts of the batch 4: the separation means 8 should be able to act in the area of the recess 12 that the products 2 form under it, whereas the gripping means 6 should be able to act outside of the scoring lines that are present for facilitating the folding, and this is accomplished in a zone from which the batch 4 can be held in the air with no problem, with an action surface that is large enough to ensure that the clamping force is great enough so that the products 2 remain against one another without thereby damaging them.

Preferably, the separation means 8 and the gripping means 6 are therefore two distinct means in the frame 5. They are optionally at least temporarily removed from one another within the frame 5, so that each one can have its zone of action on the batch 4. Actually, there is generally a period of time during which the separation means 8 and the gripping means 6 act simultaneously on the batch 4. As already mentioned, during the transfer, the batch 4 can also be retained both by the separation means 8 and by the gripping means 6, which then remains the means that handles the bulk of the delivery of the batch 4.

The frame 5 equipped with the separation means 8 and the gripping means 6 therefore forms a tool mounted on the end of a robotic means 7. The latter ensures its movement in relation to the pile 3. The separation means 8 and/or the gripping means 6 can also move in the frame 5. This makes it possible, when necessary, to create a movement in relation to the batch 4 without thereby moving the frame 5.

The frame 5 can also be equipped with suction cups for grasping a product 2 at the top.

Since the products 2 of the pile 3 are stacked in the same orientation in groups, with these groups being stacked in different orientations, and the extraction device 1 each time grasps such a group, the number of products 2 sent by the extraction device 1 is stable and known each time. This facilitates the monitoring of the filling of the storage unit that feeds the extraction device 1.

In some particular embodiments, it is conceivable that the separation means 8 be configured for, in addition to its presence in the recess 12, also extending against the section of the batch 4 to be grasped above. The separation means 8 can then not only raise the batch 4 but also push it thanks to this support. The separation means 8 can thus take the shape of a sheet with a corresponding return, with the latter coming in approximately vertically once in operation against the pile 3.

Figure 2:
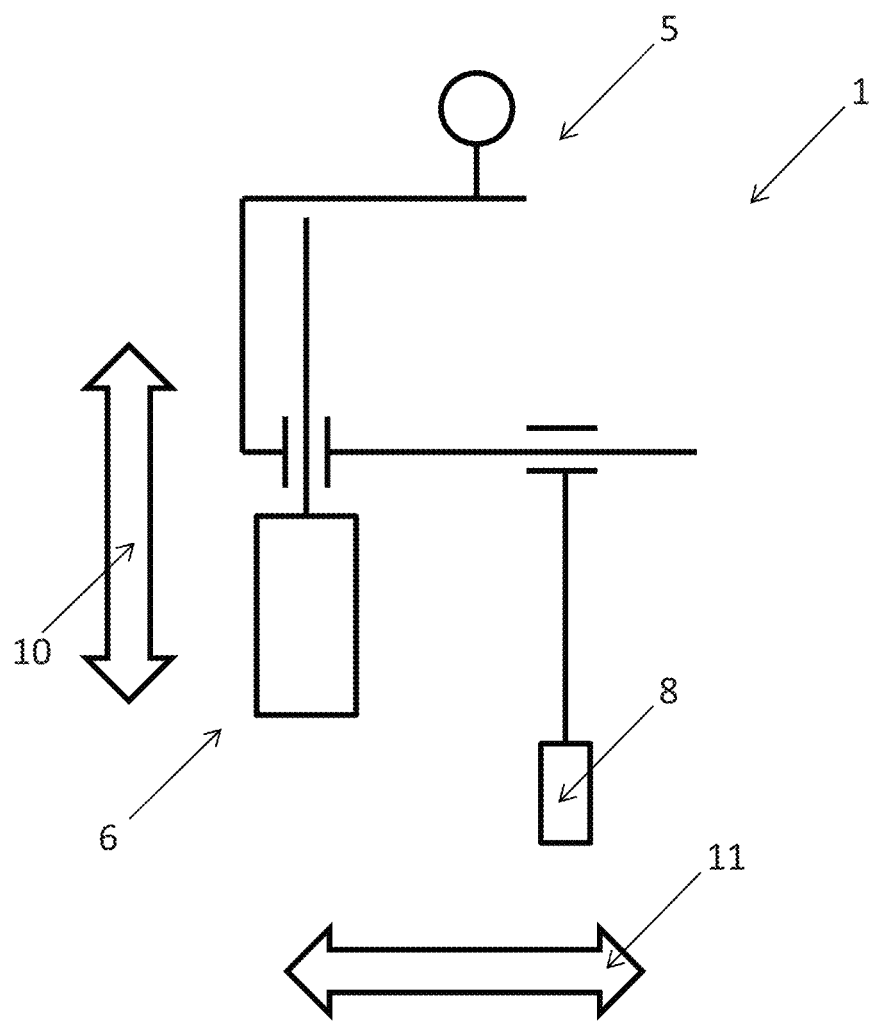
FIG. 2 illustrates a gripping head with two degrees of movability.
Figure 3:
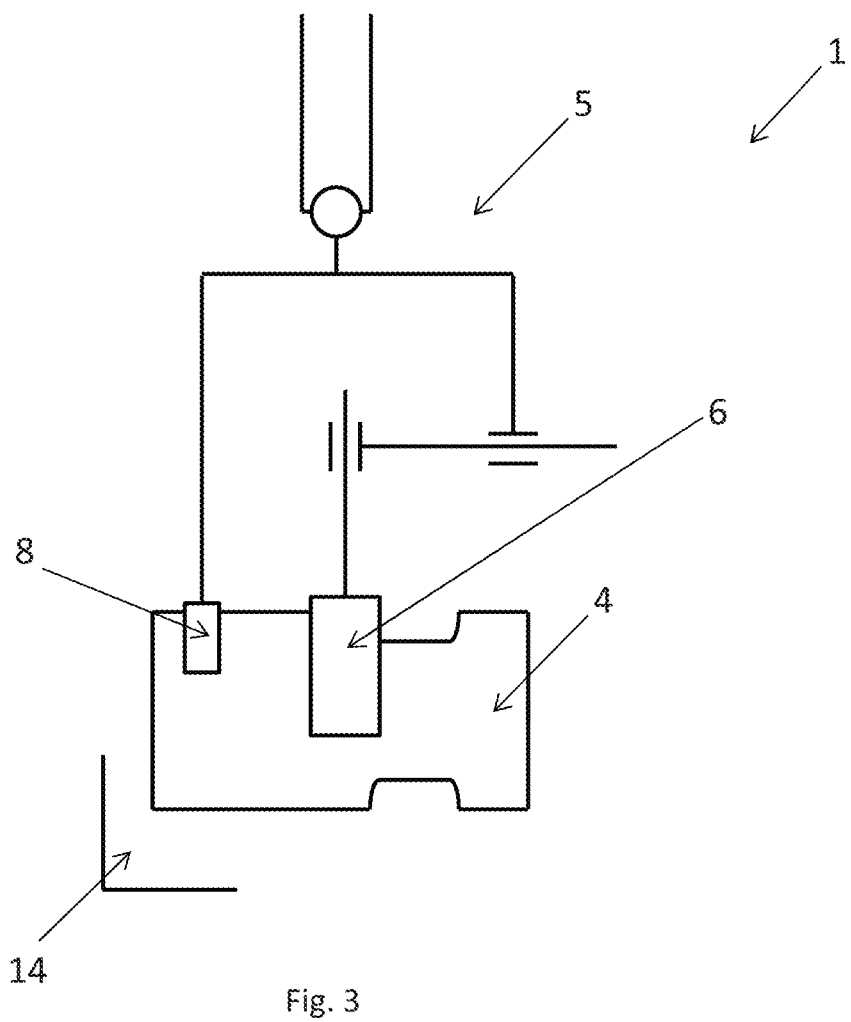
FIG. 3 shows in diagram form the gripping head holding a batch of products.

According to a possible additional characteristic, the separation means 8 and the gripping means 6 can move in relation to one another in the frame 5 along a frontal insertion direction 10 of the gripping means 6 around the batch 4, in particular thanks to the mounting of at least one among the separation means 8 and the gripping means 6 on an actuator that is mounted in the frame 5 and that acts along said frontal insertion direction 10; see in particular FIGS. 1 to 3.

The gripping means 6 grasps the batch 4 section by section, like a clamp. This clamp is essentially formed by two sheets or bits facing one another, and designed to work, one with the upper surface of the batch 4, and the other with the lower surface. The gripping means 6 also has a clamp bottom, from which these sheets normally extend and against which the section of the batch 4 can come if the gripping means 6 is inserted until contact is made with the batch 4. The frontal insertion direction 10 therefore extends essentially perpendicular to the bottom of the gripping means 6.

Causing a movement of one in relation to the other in the frame 5 makes it possible to avoid having to move the entire frame 5 using the robotic means 7 when it is only necessary to create a movement, in relation to the pile 3, of one or the other means. This makes it possible, for example, to retract toward the rear the gripping means 6 when the separation means 8 approaches the batch 4.

According to another possible additional characteristic, the separation means 8 and the gripping means 6 can move in relation to one another in the frame 5 along a transverse direction 11 that is essentially perpendicular to a frontal insertion direction 10 of the gripping means 6 around the batch 4 and in the plane of said batch 4. A movement in such a transverse direction 11 makes it possible, for example, to place the gripping means 6 against the batch 4 in the vicinity of the separation means 8, and then to move it in relation to the batch 4 up to the proper position. FIGS. 2 and 3 illustrate these possible degrees of freedom.

Figure 4:
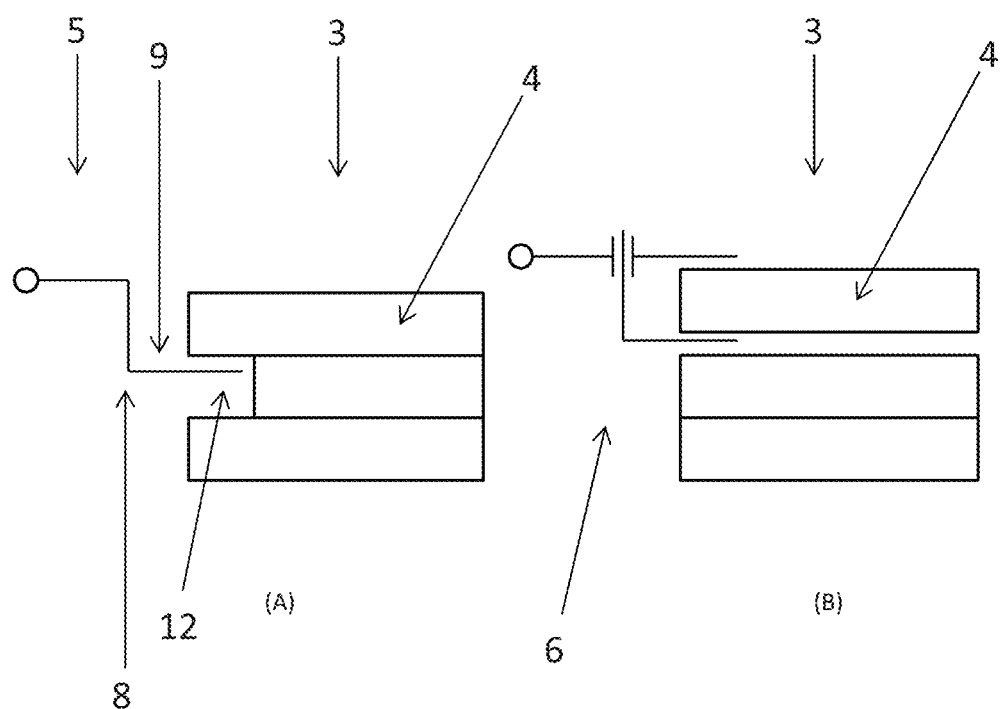
FIG. 4 shows, in its part A, the position of the tool for the separation of the batch, and, in its part B, the position of the tool for the clamping and the gripping of the batch.
Figure 5:
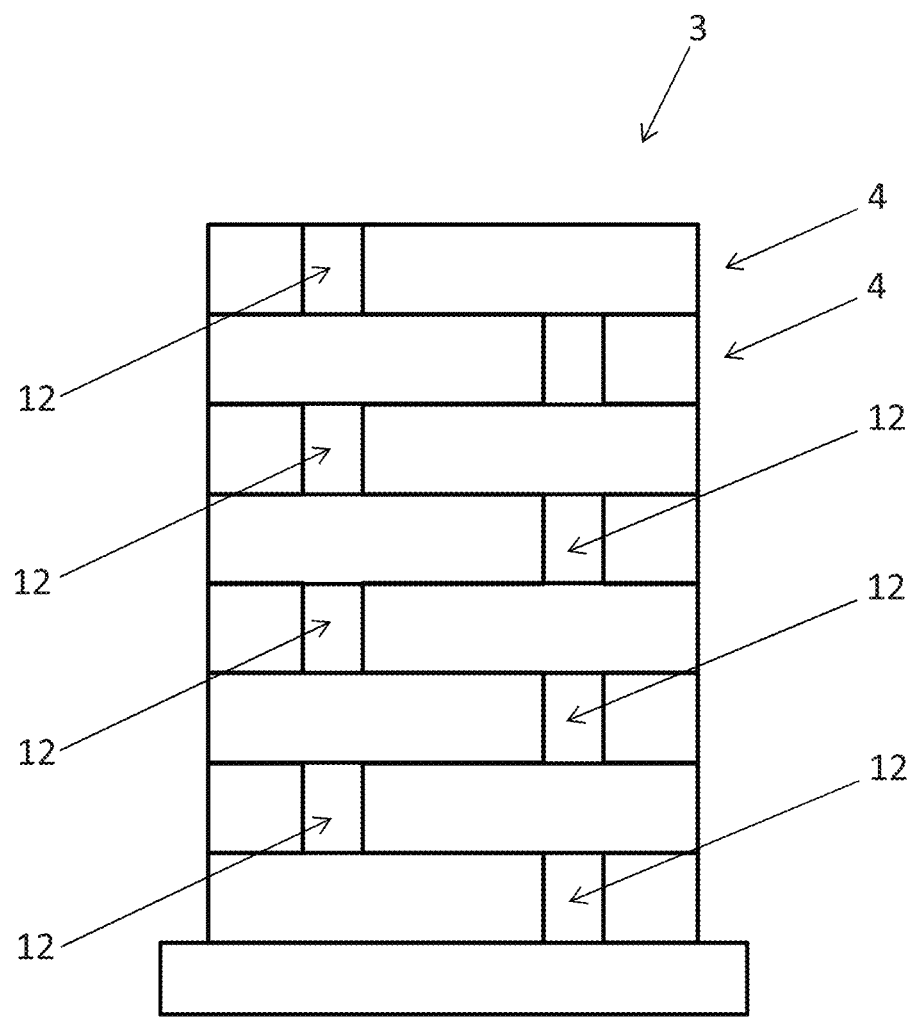
FIG. 5 illustrates the positioning in staggered rows of the product batches.
Figure 6:
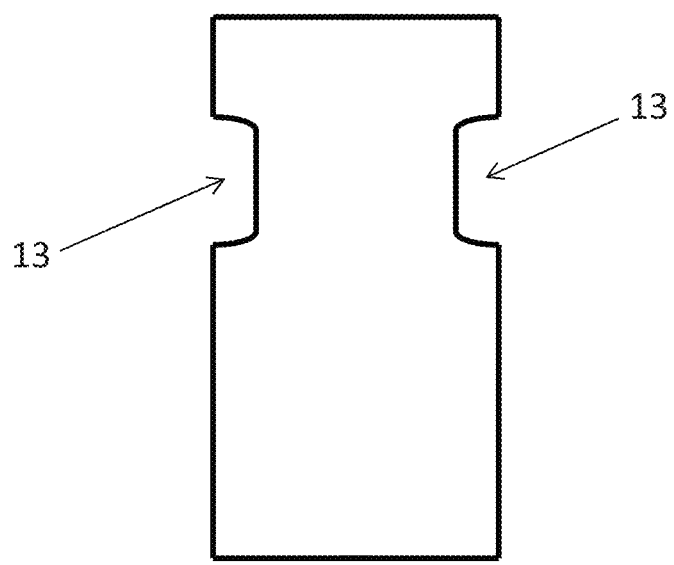
FIG. 6 shows in diagram form a product with scalloped cut-outs.

In preferred embodiments, the separation means 8 takes the form of a controlled vise that can grasp the batch 4 of products 2 section by section. As already mentioned, the separation means 8 acts to offset the batch 4 to be extracted in relation to the pile 3. To do this, and so as to avoid destabilizing the stacked products 2, the separation means 8, and in particular the support surface 9 that it carries, travels in the recess 12 under the batch; see FIG. 4A. The gripping means 6 grasps the batch 4 in another portion of the batch 4; see FIG. 4B.

The separation means 8 can consist of only one sheet, shovel or other surface support, carrying the support surface 9 to flatten against the bottom of the batch 4. This has the advantage of being simple. To make it possible, however, to better control the integrity of the batch 4 during the separation, and also optionally to release it from the pile 3 along more elaborate movements, the separation means 8 can itself grasp the batch 4 as a clamp, i.e., with a bit against the lower surface of the batch 4, and with a bit against the upper surface of the batch 4.

According to another possible additional characteristic, the separation means 8 acts on a surface of the batch 4 that is smaller than the one on which the gripping means 6 acts. Thus, the surface contact, against the upper part and/or the lower part of the batch 4, is smaller for the separation means 8 than for the gripping means 6. The surface of the scalloping 13 is actually relatively small, and the head-to-foot mounting of the groups on one another also does not necessarily bring the recess 12 into the area of an ideal holding zone for the batch 4 above.

The gripping means 6 has a higher interaction surface with the batch 4. The separation means 8 is to be able to travel in the recess 12 and is used only to offset the batch 4 for making possible the implementation of the gripping means 6.

The invention also has as its object a method using the device as described above, namely a method for extracting from a vertical pile 3 a batch 4 of stacked flat products 2 that are not connected to one another, forming the top of said pile 4, comprising the sequence of steps consisting in Slightly separating the batch 4 from the rest of the pile 3 under it Grasping the batch 4 section by section using a gripping means 6, and Moving the batch 4 in the direction of a storage unit of a treatment machine of the packaging or box shaper type.

During the movement, the batch 4 can be held only by the gripping means 6, or held also by the separation means 8, in the case where it is capable not only of pushing the batch 4 from the bottom, but also of grasping the batch 4.

Separating the batch 4 is done by raising it in relation to the pile 3, which then generally comes down to tilting it or then in moving it along the products 2, i.e., by making the batch 4 slide over the products 2 from below.

According to the invention, the separation of the batch 4 is done by initially bringing a support surface 9 upward, against the bottom of the batch 4. The entire support surface 9 therefore comes against the batch 4 at the same time. Once the support surface 9 is against the batch 4, it is enough either to bring a counter-surface against the top of the batch 4 to close a clamp and then to maintain the batch 4, or to continue this movement upward to raise the batch 4 and to separate it from the pile 3.

By bringing the support surface 9 against the batch 4 at the bottom, it is not necessary to exert a horizontal movement to put it into position, which therefore avoids any danger of causing the products 2 to drop, damaging them, and any additional necessity for a thrust ring.

In possible embodiments, the support surface 9 moves up and down against the batch 4 by traveling in a recess 12 created by the scalloping 13 of a number of stacked products 2 under the batch 4. The support surface 9 is carried by the separation means 8. The support surface 9 is carried by a sheet of said means, the latter optionally being provided with a counter-sheet to form a clamp. It is understood, of course, that the support surface 9 is brought into the core of the recess 12 by a movement that naturally has a component that is parallel to the plane of the products 2. This insertion, however, is done in the area of the recess 12 and not against the material of the products 2, therefore without risk.

The products 2 have scalloping 13 in their otherwise rectangular perimeter. This stacking of scallops 13 creates a recess 12 starting from the outside surface of the pile 3. It is within this recess 12 that the support surface 9 comes. It makes it possible for it to touch the batch 4 at the bottom, since the batch 4 is placed in a different orientation and thus plugs the recess 12 at the top and offers to the support surface 9 the possibility of making contact from the bottom, toward the top.

According to a possible additional characteristic, the separation of the batch 4 is done using a separation means 8 in the form of a controlled vise for taking the batch 4 section by section and of which one of the bits carries the support surface 9. The other bit therefore comes into contact with the outside surface of the topmost product 2 in the batch 4.

According to another possible additional characteristic, grasping the batch 4 to move it is done using a gripping means 6 of the controlled vise type, which acts in a zone of the batch 4 that is different from the one where the support surface 9 acts. The separation means 8 and the gripping means 6 can both contribute to keeping the batch 4 in the frame 5 during the transfer.

Finally, in possible embodiments, the gripping means 6 is brought into its position for grasping the batch 4 by moving it, in relation to the support surface 9, along the section of the batch 4 that is grasped and/or toward the opposite section. Once the separation means 8 has offset the batch 4 for making it possible to insert the gripping means 6 smoothly, the latter can be brought into position by moving in a suitable way the frame 5 in which it is mounted in an immovable way and/or by moving the gripping means 6 within the frame. This movement in the frame 5 can be made along the frontal insertion direction 10 and/or along the transverse direction 11.

Figure 7:
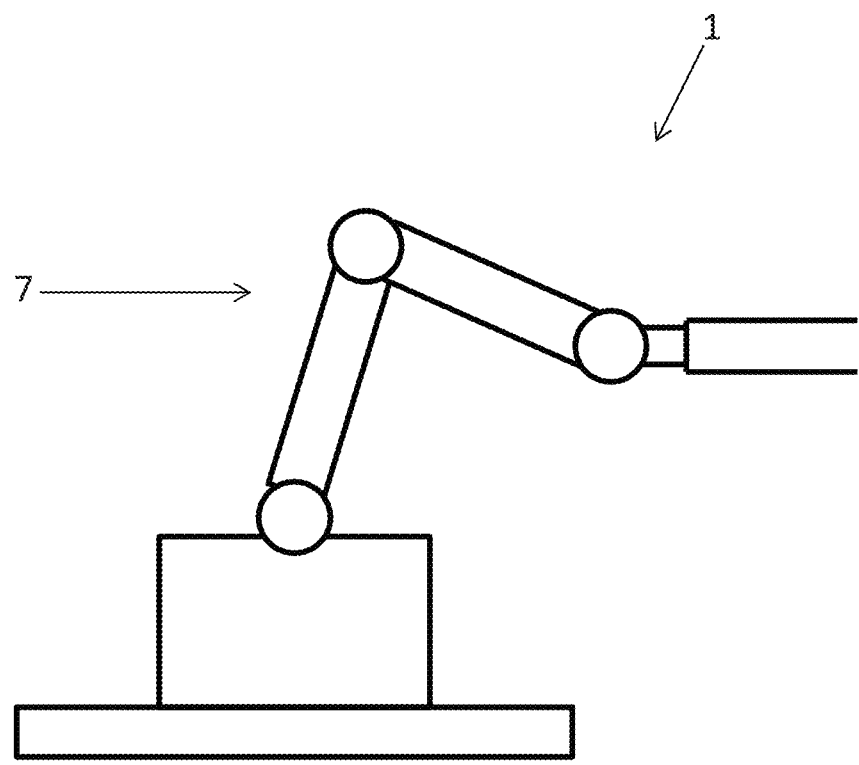
FIG. 7 shows in diagram form the gripping tool mounted on a robot.

In the embodiment illustrated in particular in FIG. 7, the extraction device 1 comprises a frame 5 that is designed to be mounted at the end of a robotic means 7, of the multi-axis robot type. The pile 3 has a stack of products 2, normally horizontal. These products 2 are in particular of small thickness in relation to their surface and can therefore be of the sheet type, optionally cardboard. The products 2 can be found on a pallet that comprises a large number of them. The extraction device 1 is provided with two different means, namely, on the one hand, a separation means 8, and, on the other hand, a gripping means 6.

The gripping means 6 is used to grasp a batch 4 of products 2 of the pile 3 to move it from said pile 3 to, for example, a storage unit of a machine of the box shaper type. The products 2 are not connected to one another, and it is therefore important that the gripping means 6 exerts a sufficient force to keep the products 2 together. The gripping means 6 acts like a vise that will clamp together the products 2 of the same batch 4 well enough to prevent any separation. The gripping means 6 therefore has a pair of bits, each designed to come against one of the two end products 2 of the batch 4.

The operation for extraction is to be done and the movement between the pile 3 and its final destination is to be made, of course, without damaging the products 2. The surface of the contact between the gripping means 6 and the batch 4 is therefore high enough to distribute the pressure that is necessary to the cohesion of the batch 4. In addition, the batch 4 is brought into rotation during its travel. It is thus necessary to position the gripping means 6 on the batch 4 in such a way as to prevent the weight and/or the inertia of the batch 4 from deforming the products 4, the latter generally having, for facilitating the folding thereof, scoring lines such as markings or cut-outs.

The gripping means 6 will therefore grasp a batch 4 section by section, in a way and at a location that make it possible to maintain it correctly during the trip and without causing deformation. The gripping means 6 therefore has geometric characteristics that could cause it to damage the products 2 when it is inserted between two products 2 of the pile 3.

The invention makes possible an installation of the gripping means 6 without any risk of damaging products 2, and this is accomplished by separation means 8, as described below.

The separation means 8 essentially serves to separate the batch 4 to be extracted from the products 2 under it, to then be able to position the gripping means 6 at the location required for its operation, as described above, and this is accomplished taking into account the size that it is to have to hold the batch 4 firmly.

The separation means 8 therefore clears the surface of the lowest product 2 in the batch 4 so that the gripping means 6 can be positioned against it. The lower surface is released by offsetting, using the separation means 8, the entire batch 4. Offsetting the batch 4 in such a way as to release the lower surface sufficiently then makes it possible to use the gripping means 6. Multiple kinematic options are possible. The batch 4 can, for example, be spaced from the products 2 under it by raising it. The batch 4 can also, for example, be spaced from the products 2 under it by offsetting it with a movement in the proper plane of the products 2, such as, for example, by pulling it slightly out of the pile 3 by a horizontal movement.

The separation means 8 can therefore be simply a form of stop that will raise the batch 4, or literally a clamp or vise that will grasp it section by section to displace it with any movement.

Advantageously, the separation means 8 has at least one support surface 9, which is designed to come against the lower surface of the batch 4 to offset it from the rest of the pile 3. To avoid damaging the products 2 of the pile 3, and in particular the products 2 of the batch 4, this support surface 9 is brought into contact with the batch 4 not by an insertion movement that is parallel to the plane of the products 2, but essentially perpendicular. Thus, the contact between the support surface 9 and the batch 4, necessary so that the separation means 8 separates the batch 4 from the rest of the pile 3 to install the gripping means, is made by bringing the support surface 9 from the bottom of the batch 4 and not from the side. The support surface 9 comes into contact with the batch 4 with a movement directed toward the top. The support surface 9 is not inserted between two successive products 2, but simply lifted until touching the lowest product 2 of the batch 4 to be separated. The support surface 9 can be formed by a sheet or else carried by a bit that comprises the separation means 8 in vise form.

To do this, the support surface 9 makes use of the peripheral recess 12 that the stacking of multiple products 2 in the same orientation forms together under the batch 4 to be grasped. The products 2 actually assume the shape of flat rectangles, extending in a horizontal plane and stacked vertically. The contour of a product 2, however, has at least one scallop 13. The stacking of multiple such products 2, in the same position, then creates a recess 12 that extends vertically and is defined by the stacked scalloping 13. The support surface 9 can thus travel vertically in this recess 12. It is then understood that by using the products 2 so that the scalloping 13 is not all stacked, it becomes possible to bring the support surface 9 into the core of the recess 12 obtained by the stacking of multiple products 2 in the same direction and to move it upward until it comes into contact with a product 2 in another direction, and said product's scalloping 13 is then located somewhere else, for example a product 2 rotated by 180 degrees in relation to those under it.

Thus, the pile 3 is organized in the form of groups or batches 4, products 2 stacked with the same orientation, in such a way that their scalloping 13 is stacked and creates a traveling recess 12 for the support surface 9. The successive groups or batches 4 in the pile 3 do not, however, have the same orientation, which makes it possible for the support surface 9 to instantaneously touch at the bottom the lowest product 2 of the upper batch 4.

A movement of insertion of the separation means 8 that extends parallel to the plane of the products 2 actually creates a force, even slight, that tends to entrain and to offset the products along this movement. The two products 2 between which the support surface 9 is inserted then slide against one another, which can cause products 2 to fall. The invention makes it possible to solve this problem without additional means for holding in position, such as vertical pressure or a thrust ring, etc.

In some preferred embodiments, the separation means 8 also assumes the shape of a vice or clamp, which will grasp the batch 4 section by section. It will be understood that the separation means 8 has not only a support surface 9, but also a thrust ring against which the support surface 9 can clamp the products 2 of the batch 4. The advantage of using such a clamp or vice is that the position of the products 2 of the batch 4 is secured while the batch 4 is offset so that the gripping means 6 has access at least to its lower surface, but also the separation movement can take any type of path.

The batch 4 that the extraction device 1 handles contains all of the products 2, starting from the highest one on the pile 3, which have the same orientation and which have, below them, multiple products 2 that are positioned in the same manner between them, but differently from the products 2 of the batch 4, in such a way that these products 2 from below create a recess 12 in which the support surface 9 can travel upward, as was described.

Preferably, at least one means among the separation means 8 and the gripping means 6 is retractable or at least movable within the frame 5. For example, the separation means 8 is stationary in the frame 5, and it is the robotic means 7 on which the frame 5 is mounted that ensures that the separation means 8 comes against the batch 4 of products 2. With a gripping means 6 that can move in the frame 5, it is then possible to bring it against the section of the batch 4 to be extracted. The gripping means 6 is thus retractable: it is retracted when the frame 5 brings the separation means 8 against the batch 4, and then it is extended to grasp the batch 4.

The robotic means 7 thus ensures the positioning of the separation means 8, and even the separation movement of the batch 4 itself. The gripping means 6 is mounted on an actuator whose maneuvering then makes it possible to bring the gripping means 6 against the batch 4 by keeping the frame 5 stationary. Then, closing the vise that forms the gripping means 6 makes it possible to connect completely the batch 4 to the frame 5 so that the robotic means 7 can move the batch 4. In the retracted position, the gripping means 6 is therefore set back in relation to the separation means 8, in such a way that it does not collide with the pile 3 when the separation means 8 is to be in contact with the batch 4.

The products 2 have an essentially rectangular, and flat, contour. Each product 2 therefore extends in a flat product 14. The support surface 9, for coming into contact with the lower product 2 in the batch 4, is driven by a movement that is essentially perpendicular to the flat product 14. The frame 5 approaches the batch 4 in advance with a movement that is parallel to the flat product 14, in particular perpendicular to the section to be grasped. This frontal insertion direction 10 is defined by the geometry of the gripping means 6 in the form of a clamp and corresponds to the direction of movement of an object that is to come into the bottom of the clamp. This frontal insertion direction 10 is parallel to an edge of the products 2 when the batch 4 is grasped in the gripping means 6, namely the edge corresponding to the section that does not grasp the gripping means 6. The transverse direction 11 then extends perpendicularly to this frontal insertion direction 10 and in the plane that the product 2 forms when it is in the gripping means 6.

In other words, the frame 5 has, on the one hand, a transverse direction 11 that corresponds to the direction in which the section extends by which the gripping means 6 grasps the batch 4, and, on the other hand, a frontal insertion direction 10, which then corresponds to the direction in which the perpendicular section extends.

In some configurations, the separation means 8 and the gripping means 6 are fixed in the frame 5, and it is the movement of the latter that brings said means against the batch 4 so that for the separation means 8, they can raise it and even clamp it, and, for the gripping means 6, they can clamp it.

In some other configurations, the separation means 8 and the gripping means 6 are mounted in the frame 5 in such a way as to be able to be driven by a relative movement, one in relation to another, along the frontal insertion direction 10 and/or the transverse direction 11.

For example, the gripping means 6 can be mounted in the frame 5 using a jack-type actuator or another linear actuator, which is extended or retracted with a movement in the frontal insertion direction 10. This makes it possible, as described below, to approach, thanks to the movement of the robotic means 7, the frame 5 of the pile 3, so that the separation means 8 separates the batch 4 to be extracted from the rest of the pile 3. It is then enough to extend the actuator from the gripping means 6 so that the former surrounds the section of the batch 4 that it is to grasp.

By the design in the frame 5 or by movement of the latter, the gripping means 6 and the separation means 8 cannot be aligned in the transverse direction 11 when the separation means 8 is to raise the batch 4. The gripping means 6 is then set back, either by retraction in the frame 5, or by the position of the frame 5 in the case of means that are mounted in a stationary way there.

The movability in the frame 5 can originate from the mounting on a controlled actuator of the separation means 8 and/or the gripping means 6. For example, the gripping means 6 can be stationary in the frame 5, and the separation means 8 is mounted on a movable actuator in the frontal insertion direction 10 that makes possible its retraction. The gripping means 6 and the separation means 8 are further away from one another in the transfer direction 11 and immovable in relation to one another in this direction. The separation means 8 and the gripping means 6 both take the form of a clamp, whose bottoms are parallel but offset, however, when the gripping means 6 is in the retracted position.

To extract a batch 4, the frame 5 is brought close to the pile 3 in such a way that the support surface 9 that carries the lower bit of the clamp that forms the separation means 8 is found in a recess 12 under the batch to be extracted. This clamp is then closed so that the separation means 8 grasps the batch 4. Once the batch 4 is grasped by the separation means 8, it is raised to move it away from the others of the pile 4, by movement of the frame 5 preferably, and even by movement upward of the separation means 8 within the frame 5. The actuator on which the gripping means 6 is mounted is then put into operation in such a way as to extend the gripping means 6 in the direction of the batch 4. The lower bit of the gripping means 6 in the form of a clamp is then inserted into the space between the batch 4 and the product 2 under it in the pile 3, created by the preliminary movement of the separation means 8. The other bit is located, of course, above the batch 4. Once the gripping means 6 is actuated, it therefore clamps the batch 4 more strongly than the separation means 8 can do it. Actually, having to travel in the recess 12, it is of limited size and defined position, not because of the necessity of not deforming the batch 4 along the way, but because of the location of scalloping 13 on the products 2.

It will be noted that for at least a brief moment, the separation means 8 and the gripping means 6 act simultaneously on the batch 4, at two different locations. In some variants, keeping the batch 4 in the frame 5 during the travel is achieved both by clamping the gripping means 6 and the separation means 8.

Once the batch 4 is clamped by the gripping means 6, it is enough that the robotic means 11 moves the frame 5 that is mounted on it so that the entire batch 4 is taken away. The release of the batch 4 is done, of course, by releasing the gripping means 6, and even also, if necessary, the separation means 8. In anticipation of a new cycle, the gripping means 6 is then retracted thanks to the actuator on which it is mounted. The bottoms of the clamps that form the separation means 8 and the gripping means 6 are then no longer in the same plane, for the purpose of preventing the action of the separation means 8 from being accompanied by an insertion of the gripping means 6 in the core of the pile 3.

In other embodiments, the gripping means 6 and the separation means 8 are movable in relation to one another in the frame 5 along the transverse direction 11; see, for example, FIG. 2. As will be described, this makes it possible to reduce the movement that is to create the separation means 8, and even also to insert the gripping means 6 earlier.

For example, the gripping means 6 is mounted on an actuator that extends in the transverse direction 11; see FIG. 3. In a first position, the gripping means 6 is against the separation means 8. In a second position, the gripping means 6 is moved away from it, which makes it possible then to grasp the batch 4 at the suitable location for the path, while having inserted the support surface 9 into the recess 12 located elsewhere. Preferably, the gripping means 6 is mounted on a pair of actuators to move it in the frame 5, one of them imparting to it a movability in the frontal insertion direction 10 and the other imparting to it a movability in the transverse direction 11. The separation means 8 can be stationary in the frame 5, and its movement in relation to the pile 3 is therefore directly defined by the movement of the frame 5 itself.

The extraction operation then takes place by approaching the frame 5 of the pile 3 until the support surface 9 of the separation means 8 is located in the recess 12 under the batch 4 to be extracted, and then in bringing this support surface 9 upward to entrain the batch 4, by lifting the frame 5 by a corresponding movement of the robotic means 7, and even by closing, finally, the clamp that forms the separation means 8. With the gripping means 6 not being moved away from the separation means 8 in the transverse direction 11, it is not necessary to clear the batch 4 in a significant way. The separation means 8 is maneuvered by the outlet of the actuator on which it is mounted, so that the clamp that it forms comes against the section of the batch 4, in a movement of displacement along the frontal insertion direction 10. Then, a movement in the transverse direction 11 is executed, moving the gripping means 6 away from the separation means 8 to the position where it is to be found for taking away the batch 4 in a way that is reliable and without damage. It will be noted that at this time, the gripping means 6 travels against the section of the batch 4 that is to be grasped and that corresponds to a movement with a slight angle in relation to the plane of the products 2 that are still on the pile 3. Once the gripping means 6 is in position, the clamp that it forms is actuated, and it then grasps the batch 4 for a displacement without damaging the products 2.

In some cases, in particular when the separation means 8 takes the form of a clamp, it is conceivable to use the separation means 8 to move the batch 4 until the gripping means 6 is in the right place against the batch 4. Thus, once the separation means 8 has grasped the batch 4 in the area of the recess 12, it moves it in relation to the pile 3 so that the gripping means 6, immovable in relation to the pile 3, can grasp the batch 4 in the right place. This offsetting, caused by the separation means 8, can be achieved by moving the frame 5 or by moving the separation means 8 in the frame 5. The gripping means 6 and the separation means 8 can therefore be close initially, and then separated from one another in the transverse direction 11 by a movement of the separation means 8 in the frame 5, and, with it, a movement of the batch 4.

More specifically, the gripping means 6 can be found, before the extraction operation, at one end of the frame 5 in the transverse direction 11, with the separation means 8 being located beside it in the direction of the other end. The gripping means 6 is initially retracted in such a way that the separation means 8 is in an awkward position for longer. The frame 5 is then moved forward so that the separation means 8 comes against the section of the batch 4 in the area of the recess and the clamp. The frame 5 then carries out a slight movement upward for the purpose of entraining the batch 4 upward in the area of its pick-up by the separation means 8. The gripping means 6 is then moved forward in the frontal insertion direction 10 to the section of the batch 4. The separation means 8, while holding the batch 4, then moves away from the gripping means 6 thanks to the movement of an actuator on which it is mounted in the frame 5. In so doing, it entrains the batch 4 with it, its section traveling in the clamp that forms the gripping means 6, not closed. Once the batch 4 is correctly positioned in relation to the gripping means 6, the former is actuated for clamping the batch 4 and can then move it thanks to the movement of the frame 5 caused by the robotic means 7.

The advantage is then that the batch 4 is brought, by the separation means 8, to the required location to be picked up by the gripping means 6 wherever it may be located, rather than running the risk of destabilizing the pile 3 following a collision with the gripping means 6, which is larger. In addition, the open gripping means 6 acts as a guide for the movement of the batch 4 under the action of the movement of the separation means 8.

As already mentioned, in some embodiments, the separation means 8 essentially consists in a sheet or shovel that will interact with the batch 4 at the bottom and carries the support surface. The batch 4 is then not clamped, but quite simply raised by this separation means 8 coming at the bottom, in the area of the scalloping 13 of the products 2 that are stacked on one another under it. The movement of the separation means 8 in relation to the pile 3 is then directly that of the frame 5, provided by the robotic means 7. It is then also conceivable that the gripping means 6 is itself also stationary in the frame 5, which makes it possible to have a particularly simple extraction device 1 since the two means are stationary in relation to one another in the frame 5. The movement of approach then consists in coming with the frame 5 in such a way that the separation means 8 comes into the recess 12 under the batch 4 to be grasped, with the frame 5 being, however, in a position such that the gripping means 6 does not undergo any interaction with the pile 3. The frame 5 is then lifted to slightly offset the batch 4, and then pivoted in such a way that the gripping means 6 comes against the section of the batch 4 to be extracted, while preserving the interaction between the separation means 8 and the batch 4. Thus, in such an embodiment combining a stationary separation means 8 in the frame 5 with a gripping means 6 itself also fixed in the frame 5, the positioning of these two means against the batch 4 is done thanks to the movements of the frame 5. In a general way, the movability of the frame 5 provided by the robotic means 7 completes the movability in the frame 5 of the separation means 8 and/or the gripping means 6, for bringing them into position against the batch 4, i.e., against the bottom surface, and even against the section of the batch 4.

In some embodiments, the separation means 8 and the gripping means 6 are mounted on the same clamp, and also optionally on the same actuator that ensures its movability in relation to the frame 5 at least in the frontal insertion direction 10. Each of these means therefore clamps the batch 4 section by section. The bits, and at least the support surface 9 of the separation means 8, are or is of a shape that is adapted to the scalloping 13. In an advantageous embodiment, the separation means 8 and the gripping means 6 are activated for clamping by the same actuator. Thus, the sheet and the counter-sheet of a single clamp form, on the one hand, the sheets of the separation means 8 and the gripping means 6, and, on the other hand, the counter-sheets of the separation means 8 and the gripping means 6.

The extraction device 1 then has a single clamp that by turns performs the function of the separation means 8 and the function of the gripping means 6. A portion of the bits of said clamp forms the bits of the separation means 8, with another part of the bits of the same clamp forming the bits of the gripping means 6. For example, the end of the bits of this clamp can form the separation means 8 and thus have a shape that is suitable for being inserted into the recesses 12. The rest of the bits of the clamp, of a larger surface area, then forms the gripping means 6. Of course, the sole lower sheet of this clamp can also be the lower sheet that carries the support surface 9 that forms the separation means 8, with the latter being able only to raise the batch 4 and not to clamp it.

A method for using such an extraction device 1 can then take place in the following way. The frame 5 of the extraction device 1 is approached from the pile 3 until the end of the single clamp that it carries, which forms the separation means 8 in the form of a clamp, comes against the section of the batch 4, with its support surface 9 traveling in the recess 12 under the batch 4 to be extracted. The extraction device 1 then grasps the batch 4 with the separation means 8 formed by the end of the clamp and therefore with a small surface corresponding at most to the size of the scalloping 13 of the products 2 under the batch 4 to be extracted. As mentioned, the support surface 9 carried by the separation means 8 comes into contact from below with the batch 4 by a movement that is essentially perpendicular to the flat product 14, in the direction of the batch 4.

Once the batch 4 is grasped by the separation means 8, it is slightly pulled from the pile 3 to clear a part of the lower surface of the batch 4 in relation to the products 2 under it in the column. This movement can be made in parallel to the flat product 14 and causes the batch 4 to be pulled and to leave it in a slightly awkward position above the pile 3. A part of the lower surface of the batch 4 that is larger than the one above the recess 12 therefore becomes available.

It will be noted that this movement of the batch 4 can be made by moving the clamp carrying the separation means 8 in the frame 5 or by moving the entire frame 5 using the robotic means 7.

Once a larger portion of the lower surface is released from the pile 3, the gripping means 6 can go into operation. It can then grasp the batch 4 with a larger contact surface and this is accomplished either approximately at the same location as the separation means 8 previously, or elsewhere. For example, after having pulled the batch 4, the clamp can open and then be moved forward again so that the bottom of the clamp further approaches the batch 4, and even comes into contact with it. The part of the clamp in contact with the batch 4 then forms the gripping means 6.

In relation to the pile 3, the frame 5 may or may not have moved during this operation. In addition, it is understood that it is conceivable to carry out the gripping of the batch 4 in more than two steps, with multiple successive movements that release a smaller surface of the batch 4 that is larger each time.

The batch 4 is therefore put in an awkward position on the pile 3 in such a way that a large enough surface is available against its bottom so that it is grasped by the gripping means 6, whose contact surface with the batch 4 is larger than the one of the separation means 8.

In another embodiment, the gripping means 6 can be moved in rotation in relation to the frame 5.

The gripping means in clamp form comprises two bits, which bits, in the open position of the gripping means, pass on both sides of the clamp of the separation means 8.

Thus, in a first step, the separation means 8 in clamp form is inserted into the area of the recess 12 under the batch 4 to be extracted. The separation means is preferably stationary in relation to the frame 5. Consequently, the insertion movements in the transverse direction 11 and in the frontal insertion direction 10 of the separation means for extracting the batch of products are made by the robotic means 7.

In a second step, the separation means in clamp form closes and exerts pressure on the batch to be separated.

In a third step, the separation means, via the robotic means 7, separates the batch from the rest of the pile 3.

In a fourth step, the gripping means 8 in clamp form grasps the batch of products by carrying out a rotational movement in relation to the frame. During this movement, the bits of the clamp forming the gripping means 8 are in an open position and each one passes from one side of the clamp of the separation means. The gripping means is positioned parallel to the separation means. The separation means is found inside the clamp that forms the gripping means 8, when the former pivots to come into a work position. The cardboard sheets or plates that the gripping means 8 is to grasp are therefore naturally encompassed between the two bits of the clamp of the gripping means, since they are initially held by the separation means that the gripping means 8 covers at least temporarily during its positioning.

The clamp of the separation means is therefore found at least temporarily between the bits of the gripping means 8 that goes toward its work position and, leaving, the same holds true for the sheets that said clamp grasps and that should then be picked up by the gripping means, which prevents any collision between the gripping means and the cardboard products. The gripping means 8 therefore has an arm and a clamp at its end. The arm can be moved in rotation at the opposite end, and this is accomplished around an axis that is essentially perpendicular to the planes that the gripping means 8 and the separation means respectively have.

Then, the gripping means in clamp form grasps the product batch by exerting pressure.

If the size of the products requires it, the device comprises a number of gripping means distributed in the frame that operate as described above.

Finally, the robotic means to which the frame is attached moves the batch of products for bringing it to its destination.

The pressure exerted by the separation means has as its function to ensure that the gripping means passes to the location where the thickness of the batch is the smallest so as to prevent any interference between the batch of products to be grasped and the gripping means. Actually, this interference could damage the batch of products and would therefore cause down-time.

Thanks to the invention, it thus is possible in particular to transfer a specific number of products 2. Actually, the transfer device 1 ensures the pick-up and the movement of a predefined number of products 2, which corresponds to the number of products 2 in a group under which the other products 2 are stacked in a group that is oriented differently. The pick-up by the extraction device 1 and then the movement of the batch 4 are made without damaging the batch 4 or running the risk of making the batch 4 or the rest of the pile 3 drop, since the approach movements are made at the bottom, upward. Such an installation therefore does not require a thrust ring as in the configurations where a pick-up tool will grasp products from the side.

Although the description above is based on particular embodiments, it is in no way limiting of the scope of the invention, and modifications can be provided, in particular by substituting equivalent techniques or by a different combination of all or part of the characteristics developed above.

The invention claimed is:

1. Method for extracting from a vertical pile (3) with a plurality of recesses (12), a batch (4) of stacked flat products (2) that are not connected to one another and that form the top of said pile (4), the products (2) having scallops (13) in their otherwise rectangular perimeter, wherein stacking of the scallops (13) creates the recesses (12) starting from the outside surface of the pile (3), the sequence of steps comprising:

Slightly separating the batch (4) from the rest of the pile (3) under it section by section using a clamping means positioned at the support surface (9);

Grasping the batch (4) section by section using a grasping controlled vise (6) mounted in a frame (5), the grasping controlled vise (6) brought into position by moving relative to the support surface (9), and Moving the batch (4) in the direction of a storage unit of a treatment machine of the packaging or box shaper type, wherein the separation of the batch (4) is carried out by initially bringing a support surface (9) into at least one of the recesses, the support surface (9) traveling under the batch (4) into the recess (12) created by the stacking of the scallops (13) and moving upward with a vertical movement against the bottom of the batch (4), and wherein the frame (5) is mounted on a multi-axis robotic manipulator (7) capable of moving the frame (5) with the batch (4) of products (2) from the pile (3) to the storage unit of the treatment machine of the packaging or box shaper type.

2. Method according to claim 1, wherein the separation of the batch (4) is carried out using a clamp or vice.

3. Method according to claim 2, wherein grasping the batch (4) for moving it is done using the grasping controlled vise (6), which acts in a zone of the batch (4) that is different from the one where the support surface (9) acts.

4. Method according to claim 1, wherein grasping the batch (4) for moving it is done using the grasping controlled vise (6), which acts in a zone of the batch (4) that is different from the one where the support surface (9) acts.

5. Method according to claim 1, wherein the grasping controlled vise (6) is brought into its position for grasping the batch (4) by moving it, in relation to the support surface (9), along the section of the batch (4) that is grasped and/or toward the opposite section.

6. Method for extracting from a vertical pile (3) with a plurality of recesses (12), a batch (4) of stacked flat products (2) that are not connected to one another and that form the top of said pile (4), the products (2) having scallops (13) in their otherwise rectangular perimeter, wherein stacking of the scallops (13) creates the recesses (12) starting from the outside surface of the pile (3), the sequence of steps comprising:

Slightly separating the batch (4) from the rest of the pile (3) under it

Grasping the batch (4) section by section using a grasping controlled vise (6) mounted in a frame (5), the grasping controlled vise (6) brought into position by moving relative to the support surface (9) and acting in a zone of the batch (4) that is different from the one where the support surface acts, and Moving the batch (4) in the direction of a storage unit of a treatment machine of the packaging or box shaper type, wherein the separation of the batch (4) is carried out by initially bringing a support surface (9) into at least one of the recesses, the support surface (9) traveling under the batch (4) into the recess (12) created by the stacking of the scallops (13) and moving upward with a vertical movement against the bottom of the batch (4), and wherein the frame (5) is mounted on a multi-axis robotic manipulator (7) capable of moving the frame (5) with the batch (4) of products (2) from the pile (3) to the storage unit of the treatment machine of the packaging or box shaper type.

7. Method according to claim 6, wherein the separation of the batch (4) is carried out using a clamp or vice that takes the batch (4) section by section and one of whose bits carries the support surface (9).

8. Method according to claim 6, wherein the grasping controlled vise (6) is brought into its position for grasping the batch (4) by moving it, in relation to the support surface (9), along the section of the batch (4) that is grasped and/or toward the opposite section.

* * * * *